United States Patent
Ginther

[15] 3,695,461
[45] Oct. 3, 1972

[54] VACUUM-ACTUATED TRANSFER DEVICE AND ASSEMBLY APPARATUS

[72] Inventor: Gary D. Ginther, Leonard, Mich.
[73] Assignee: Clyde Corporation, Troy, Mich.
[22] Filed: Oct. 14, 1970
[21] Appl. No.: 80,701

[52] U.S. Cl..............214/1 BT, 294/64 R, 214/8.5 F
[51] Int. Cl................................................B66c 1/02
[58] Field of Search........294/64 R; 214/1 BS, 1 BT, 214/1 BH, 1 BV

[56] References Cited

UNITED STATES PATENTS

| | | | |
|---|---|---|---|
| 3,227,070 | 1/1966 | Brigham | 214/1 BV |
| 3,563,170 | 2/1971 | Cvacho | 214/1 BV X |
| 3,567,043 | 3/1971 | Sirvet | 294/64 R |

*Primary Examiner*—Gerald M. Forlenza
*Assistant Examiner*—George F. Abraham
*Attorney*—Barnes, Kisselle, Raisch & Choate

[57] ABSTRACT

Piston rod and piston have passageways for introducing vacuum into a cylinder at both sides of the piston. Cylinder has an open end with a sealing surface which advances against an article and then retracts with the article as a result of vacuum acting on differential effective areas of the piston. The device is mounted on a movable head so that it transports the article from a feed shuttle to a workpiece, and tools on the head secure the article to the workpiece.

14 Claims, 7 Drawing Figures

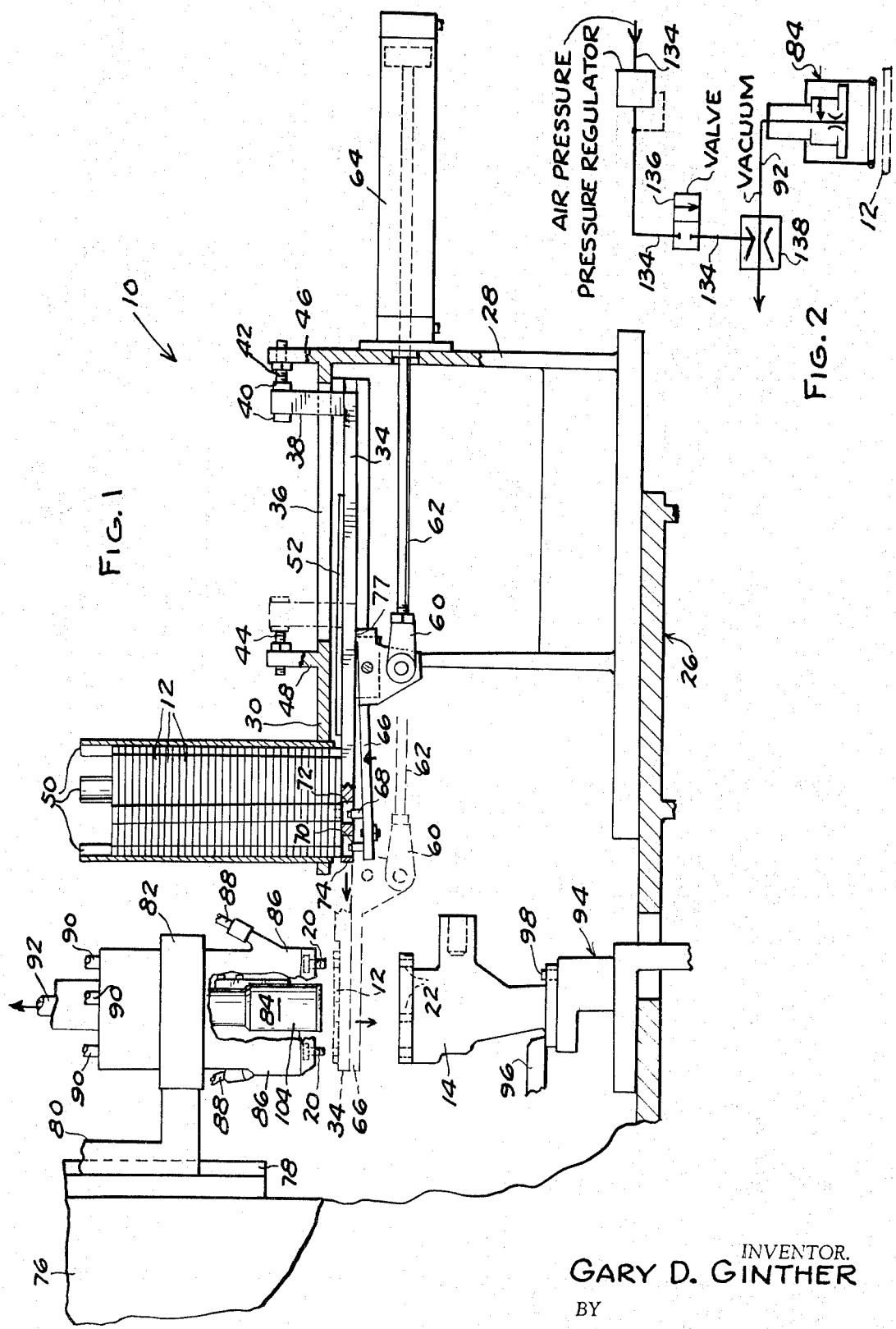

INVENTOR.
GARY D. GINTHER
BY
Barnes, Kisselle, Raisch & Choate
ATTORNEYS

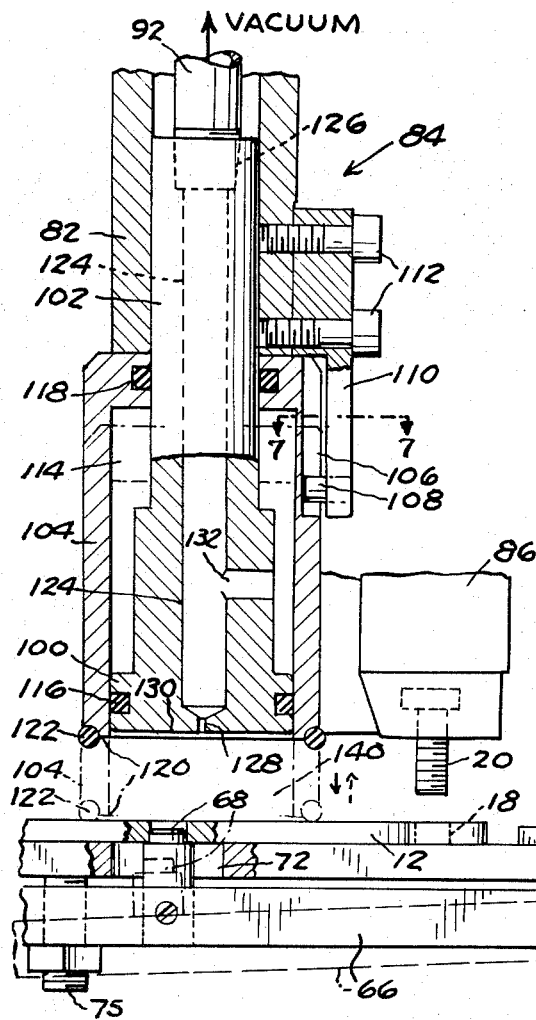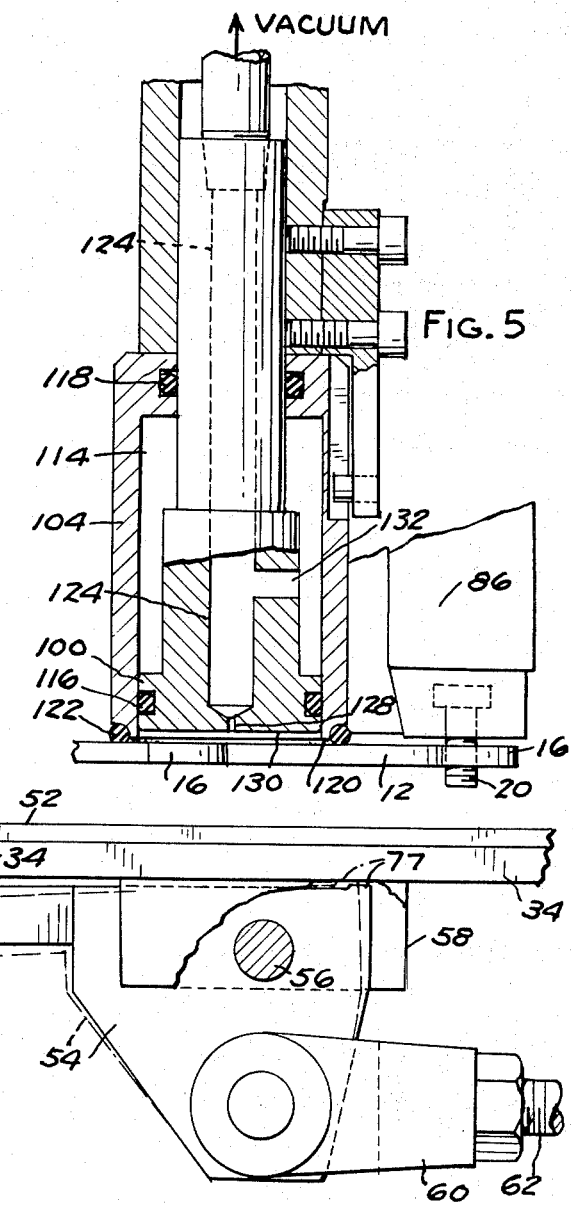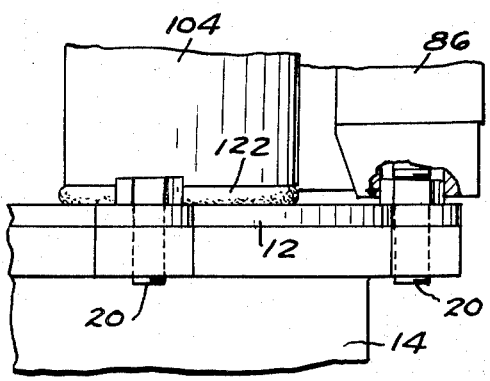

VACUUM-ACTUATED TRANSFER DEVICE AND ASSEMBLY APPARATUS

This invention relates generally to apparatus for assembling articles and more particularly to a device which utilizes vacuum to pick up and hold an article while it is transferred from one location to another, as from a feeding station to a workpiece.

Conventional vacuum pick-up and transfer devices are moved bodily from one location to another location where they engage the workpiece to be transferred. After the workpiece has been secured to the device by vacuum, the entire device is then moved bodily in the opposite direction to transfer the workpiece. This necessitates the operation of some mechanism, valving, circuitry, or the like to cause a reversing of the direction of movement of the transfer device after it has engaged the workpiece.

A principal object of the present invention is to provide a vacuum pick-up or transfer structure which is improved over conventional structures in that it is simpler, less expensive, and, nevertheless, functions automatically to reverse its own direction immediately upon establishing a vacuum draft connection with a workpiece.

In general, the invention contemplates the use of a piston and piston rod mounted within a cylinder, the piston dividing the cylinder into a sealed chamber containing the piston rod and an open-ended chamber on the opposite side of the piston. The piston rod and piston are provided with passageways which introduce vacuum into both chambers simultaneously. The open end of the cylinder has a seal for engaging a workpiece. When vacuum is introduced into the chambers, the cylinder is advanced toward a workpiece by vacuum in the sealed chamber. When the sealing surface engages the workpiece, the workpiece itself seals the open-ended chamber; and the cylinder with the workpiece retracts because of the larger effective area of the piston exposed to the vacuum in the open end of the cylinder. One form of the invention is shown in the accompanying drawings.

FIG. 1 is, in general, a side elevational view of assembly apparatus incorporating the present invention, parts being shown in section and in phantom to illustrate structural details and functioning.

FIG. 2 is a schematic view of circuitry to the transfer device.

FIG. 4 is an enlarged scale, fragmentary, elevational view of the apparatus with parts broken away and shown in section to illustrate structural details.

FIG. 5 is a view generally similar to FIG. 4 showing the vacuum transfer device in a different condition.

FIG. 6 is a fragmentary elevational view illustrating the step of securing two workpieces together.

FIG. 7 is a sectional view on line 7—7 of FIG. 4.

Figure 3:
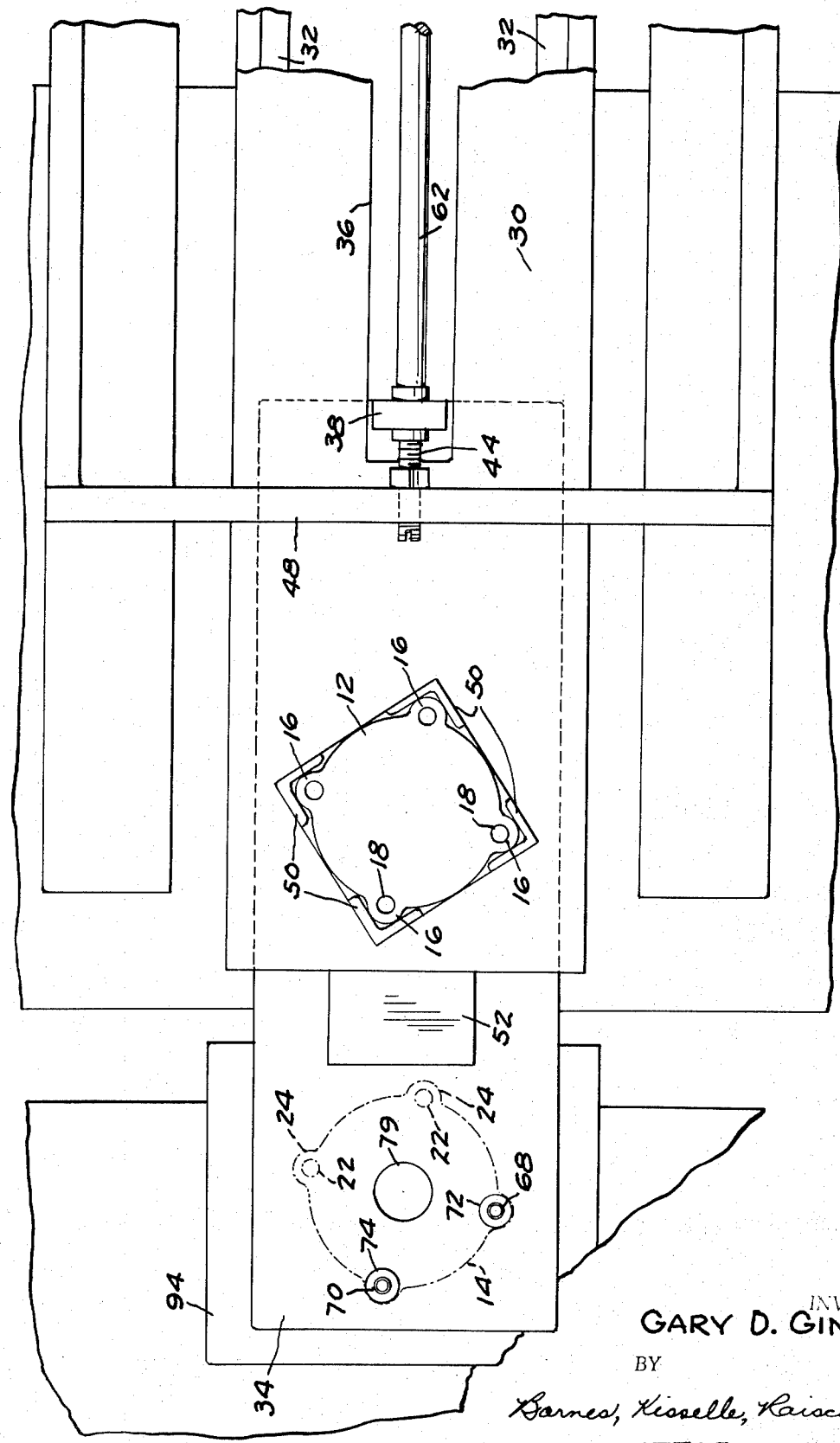
FIG. 3 is an enlarged scale fragmentary plan view of a part of the apparatus.

Selected for illustration of the invention is an apparatus 10 for assembling cover plates 12 on the bodies 14 of oil pumps for automobiles. Each cover plate has a plurality of ears 16 each with an opening 18 through which screws 20 pass for threaded engagement in tapped openings 22 in ears 24 on pump body 14.

The apparatus includes a bed 26 which supports a frame 28 having a top 30. Supported beneath top 30 are a pair of ways 32 within which a slide 34 moves to the left and right as FIG. 1 is viewed. Top 30 has a slot 36 through which a post 38 on slide 34 projects, the post having lugs 40 which engage threadedly adjustable stops 42, 44 on upwardly projecting portions 46, 48 respectively of frame 28. Stops 42, 44 limit the extent of movement of slide 34. Mounted on top 30 of the frame is a magazine 50 which contains a stack of cover plates 12. The bottom of magazine 50 is open so that the bottom cover plate therein rests upon the top of slide 34. On top of the slide is a plate 52 whose purpose is described below.

A crank 54 is pivotally mounted at 56 on pillow blocks 58 beneath slide 34. One arm of the lever is connected by a clevis 60 to the piston rod 62 of a pneumatic or hydraulic cylinder 64 mounted on frame 28. The other arm of lever 54 has an extension 66 which carries a plurality of upwardly projecting pins 68, 70. These pins project upwardly through openings 72, 74 in slide 34 for engagement within a corresponding plurality of cover plate openings 18 when crank extension 66 is rocked upwardly from the dotted-line position of FIG. 4 to the solid-line position.

The extent of upward rocking movement of extension 66 is adjusted by means of a threaded stop 75 which engages the underside of slide 34. The extent of downward rocking movement is limited by engagement of a lug 77 against the underside of slide 34, this lug being disposed on the opposite side of pivot 56 from extension 66. Slide 34 is provided with a central vent hole 79 for a purpose to be described.

A stanchion 76 on bed 26 supports vertical ways 78 within which a slide 80 moves, and a laterally projecting head 82 on the slide carries a vacuum pick-up and transfer device 84, as well as four powered screwdriving tools 86 (only two appearing in FIG. 1). Screws 20 are fed one at a time to screwdrivers 86 through tubes 88 by suitable feeding equipment not forming a part of this invention, and the screwdrivers are furnished with propelling compressed air through ducts 90. Vacuum is provided to transfer device 84 through tubing 92.

A conveyor 94 carries a succession of oil pump bodies 14 beneath head 82, the direction of movement being perpendicular to the plane of FIG. 1. The pump bodies are secured to conveyor 94 by suitable means such as clamps 96 and dowel pins 98. Vacuum transfer device 84 includes a piston 100 having a piston rod 102 fixedly mounted on head 82. A cylinder 104 surrounding piston 100 is mounted for axial movement relative to the piston. The cylinder has a keyway 106 which embraces a key 108 projecting inwardly from a support 110 bolted to cross head 82 as at 112.

Cylinder 104 has an internal chamber 114 at the side of piston 100 from which piston rod 102 projects. This chamber is pneumatically sealed by O-rings 116 and 118. The end portion 120 of cylinder 104 is open, and this end portion is provided with a sealing surface which, in the illustrated apparatus, comprises a seal ring 122 of rubber, neoprene, or the like.

Piston rod 102 has an internal passageway 124, one end of which is connected to vacuum tube 92 at 126. Passageway 124 extends longitudinally through piston 100 and at its opposite end has a restricted port 128 which opens through the end face 130 of the piston 100 which is disposed toward open end 120 of cylinder 104.

Passageway 124 has a branch passageway 132 which opens into sealed chamber 114.

Vacuum line 92 is placed under vacuum by any relatively simple circuitry such as that shown in FIG. 2 wherein pressure in an air line 134 is reduced by a pressure regulator and a simple two-way valve 136 controls the flow of air through line 134 to a conventional venturi-type vacuum transducer 138 into which vacuum line 92 is connected.

In use, it may be assumed that conveyor 94 has brought a pump body 14 into alignment beneath crosshead 82. Suitable conventional controls are operated to actuate cylinder 64 and advance piston rod 62 and clevis 60 to the left as FIG. 1 is viewed. Because of inherent friction in the system, this results initially in upward rocking movement of crank extension 66 so that pins 68, 70 pass upwardly through slide openings 72, 74 and engage within cover plate openings 18.

Thereafter, slide 34 is advanced to the left and pins 68, 70 strip the bottom cover plate 12 out of magazine 50. The cover plate is carried to the left until it is accurately aligned beneath cross head 82, at which time a lug 40 on post 38 engages stop 44. Slide plate 52, which has about the same thickness as cover plates 12, moves into supporting relation beneath the remaining cover plates in magazine 50. The parts are now in the position shown in FIG. 3 and in dotted lines in FIG. 1 with plate 12 positioned beneath vacuum device 84 and openings 18 positioned beneath screws 20 previously fed to screwdrivers 86. In FIG. 3, slide 34 is shown without a cover plate thereon.

Valve 136 is now opened; and in the diagram of FIG. 2, this is done by moving the valve member from the closed position illustrated to an open position wherein the arrow is aligned with adjacent portions of air line 134. Air from the air line passes through venturi 138 which induces vacuum in line 92, passageways 124, 132, and sealed chamber 114 within cylinder 104. This causes cylinder 104 to advance toward cover plate 12 downwardly as the drawings are viewed until seal 122 engages the cover plate. This position is represented in dotted lines in FIG. 4.

A sealed chamber 140 is thereby created beneath lower face 130 of piston 100, this chamber being defined by portions of cylinder 104, seal 122, cover plate 12, and O-ring 116. Air is immediately evacuated from chamber 140 through port 128. The portion of plate 12 surrounded by seal 122 in effect becomes a head of cylinder 104 having an effective area greater than the effective area of piston 100 exposed to chamber 114, since the effective area of this piston portion is diminished by the cross-sectional area of piston rod 102.

Therefore, atmospheric air pressure on the underside of plate 12 forces the plate and cylinder 104 upwardly from the position of FIG. 4 to the position of Fig. 5. During this movement, cover plate openings 18 pass upwardly around screws 20. Openings 72, 74, and 79 in slide 34 provide vents to facilitate penetration of air between the cover plate and the slide and consequent parting of the cover plate from the slide.

Advancement and retraction of cylinder 104 with plate 12 occurs in a fraction of a second. Elsewhere herein, for the sake of convenience, this sequence has been described as resulting from introducing vacuum into cylinder 104.

Restricted port 128 limits the flow of air from atmosphere through passageways 124, 132, 92 prior to engagement of seal 122 against cover plate 12 so that adequate vacuum can be maintained in chamber 114 without an unduly high rate of air flow through venturi 138.

Cylinder 64 is now actuated to retract piston rod 62 and clevis 60. During the initial movement, extension 66 is rocked downwardly from the solid-line position to the dotted-line position of FIG. 4; and thereafter, slide 34 is retracted to the solid-line position of FIG. 1 at which a lug 40 on post 38 engages stop 42. During terminal movement of the slide, plate 52 retracts from under the stack of cover plates in magazine 50 so that the bottom cover plate drops onto the top of the slide.

Suitable conventional controls and mechanism are now actuated to advance crosshead 82 toward pump body 14 downwardly as the drawings are viewed. Transfer device 84 carries cover plate 12 downwardly into engagement against the top of pump body 14 and screws 20 enter the upper extremities of tapped openings 22 in the pump body. Screwdrivers 86 are actuated by suitable conventional controls and drive screws 20 into openings 22 as shown in FIG. 6.

Valve 36 is returned to the closed position of FIG. 2, relieving vacuum in cylinder 104 and crosshead is retracted upwardly to the position of FIG. 1. Another set of screws 20 is fed into screwdrivers 86, and the apparatus is ready for another cycle of operation when a successive pump body 14 is conveyed into alignment with crosshead 82.

By utilizing a plurality of pins 68, 70, the rotative orientation of cover plate 12 is properly maintained so that openings 18 pass over the awaiting screws 20 when the cover plate is elevated. Key 108 and keyway 106 in the cylinder cooperate to maintain piston 100 and cylinder 104 in substantially the same relative rotative orientation so that cylinder 104 does not tend to rotate a cover plate 12 being carried thereby. The cover plate arrives at engagement with the pump body in proper position for unobstructed driving of screws 20 into the pump body.

Transfer device 84 is useful for transferring articles in general from one location to another. The transfer device need not have the vertical orientation illustrated but is equally capable of functioning in a horizontal or angled position. If an unusually large article is to be transferred, several vacuum transfer devices 84 could be utilized to engage different portions of the article. While the use of seal ring 122 is convenient, the sealing surface at the open end 120 of cylinder 104 can be provided by any other convenient or suitable means such as simply machining the open end surfaces of the cylinder accurately

I claim:

1. A vacuum-actuated device for transferring articles comprising, a relatively movable piston and cylinder, the cylinder having a sealed chamber at one side of the piston and another chamber at the other side of the piston having a portion which defines porting open to the atmosphere, said piston having a smaller effective area exposed to said one chamber than to said other chamber, passageway means adapted to place both of said chambers in communication with a vacuum source, said porting being pneumatically closable responsive to engagement of said portion with an article with which said device is adapted to be used.

2. The device defined in claim 1 wherein said porting is open in a direction axial of the cylinder.

3. The device defined in claim 2 wherein said porting is at an end of said cylinder.

4. The device defined in claim 3 wherein said cylinder is substantially entirely open at said end to provide said porting.

5. The device defined in claim 4 wherein said end of aid cylinder is provided with an annular seal positioned for engagement with said article.

6. The device defined in claim 1 wherein a piston rod extends from said one side of said piston to the exterior of said cylinder and provides said one side with said smaller effective area.

7. The device defined in claim 6 wherein portions of said piston and piston rod define said passageway means.

8. The device defined in claim 7 wherein said passageway means comprises a passageway which extends longitudinally through said piston rod and piston and opens into said other chamber, said passageway having a branch which opens into said sealed chamber.

9. The device defined in claim 1 wherein said porting comprises a single opening defined by an open end of said cylinder, means providing a sealing surface around said opening for engagement with said article, a piston rod extending from said one side of said piston to the exterior of said sealed chamber and providing said one side with said smaller effective area, said passageway means comprising a passageway which extends longitudinally through said piston rod and piston, said passageway having one end adapted for connection to a source of vacuum and another end which opens into said other chamber, said passageway having a branch which opens into said sealed chamber.

10. The device defined in claim 9 wherein said other end of said passageway has an effective area smaller than that of said one end and said branch.

11. The device defined in claim 1 wherein a piston rod extends from said one side of said piston and has a portion which projects exteriorly of said sealed chamber, said piston rod portion being mounted on a support, said cylinder being movable relative to said piston rod and support, said piston rod providing said one side of said piston with said smaller effective area, and in combination therewith feed means operable to present a said article at a location aligned with said cylinder portion which defines said porting, said portion being advanceable into engagement with said article responsive to introduction of vacuum into said sealed chamber and being retractable with said article responsive to closing of said porting upon engagement of said cylinder portion with said article.

12. The combination defined in claim 11 and including in addition a receptacle adapted to receive a said article, said support being movable to transport said piston rod between said location and a position adjacent said receptacle, said device being effective to deposit an article carried thereby on said receptacle responsive to release of vacuum in said cylinder.

13. The combination defined in claim 12 wherein the direction of movement of said support between said location and position and the direction of movement of said cylinder relative to said piston are substantially parallel.

14. The combination defined in claim 12 wherein said receptacle comprises a workpiece to which a said article is to be applied, said support carrying tool means, said tool means being operable to secure to said workpiece a said article deposited thereon by said device.

* * * * *